United States Patent
Coates et al.

(10) Patent No.: US 10,978,725 B2
(45) Date of Patent: Apr. 13, 2021

(54) CONTROL VALVE, FUEL CELL EXHAUST ASSEMBLY AND FUEL CELL

(71) Applicant: Intelligent Energy Limited, Loughborough (GB)

(72) Inventors: Gareth Coates, Loughborough (GB); Karl Blackmore, Loughborough (GB); Ralph Clague, Loughborough (GB)

(73) Assignee: Intelligent Energy Limited, Loughborough ( * ) Notice: Subject to any disclaimer, the term of this patent is extended or adjusted under 35 U.S.C. 154(b) by 0 days.

(21) Appl. No.: 15/532,950

(22) PCT Filed: Nov. 27, 2015

(86) PCT No.: PCT/GB2015/053625
§ 371 (c)(1),
(2) Date: Jun. 2, 2017

(87) PCT Pub. No.: WO2016/087825
PCT Pub. Date: Jun. 9, 2016

(65) Prior Publication Data
US 2017/0346113 A1 Nov. 30, 2017

(30) Foreign Application Priority Data
Dec. 3, 2014 (GB) .................................. 1421475

(51) Int. Cl.
*H01M 8/04223* (2016.01)
*F16K 11/044* (2006.01)
(Continued)

(52) U.S. Cl.
CPC ....... *H01M 8/04231* (2013.01); *F16K 11/044* (2013.01); *F16K 31/0627* (2013.01); *H01M 8/04179* (2013.01); *H01M 8/04291* (2013.01)

(58) Field of Classification Search
CPC .............. H01M 8/04082–04104; H01M 8/04223–04231; H01M 8/04298–043;
(Continued)

(56) References Cited

U.S. PATENT DOCUMENTS 1,575,771 A * 3/1926 King ................... F16K 11/048
137/112
2,754,840 A * 7/1956 Hicks, Jr. ............... F15B 13/02
137/270

(Continued)

FOREIGN PATENT DOCUMENTS

CN 1627552 A 6/2005
CN 201779311 U 3/2011
(Continued)

OTHER PUBLICATIONS

Machine Translation of Sueyoshi, JP 2002-174397, Published Jun. 21, 2002. (Year: 2002).*
(Continued)

Primary Examiner — Jonathan Crepeau
Assistant Examiner — Jacob Buchanan
(74) Attorney, Agent, or Firm — BakerHostetler

(57) ABSTRACT

A control valve for controlling the exhausting of a purge gas from a fuel cell assembly, comprising a valve body having a valve member therein moveable between a first position and a second position, an inlet port for receiving a purge gas from the fuel cell assembly and an outlet port for providing an outlet for the purge gas, the valve member configured to, in the first position, prevent purge gas from flowing between the inlet port and the outlet port and, in the second position, allow the flow of purge gas between the inlet port and the outlet port, the valve body including a drain port adapted and arranged in the valve body to allow liquid to drain out of the (Continued)

valve body, the drain port configured to close when the valve member is in the second position.

19 Claims, 2 Drawing Sheets

(51) Int. Cl.
    *F16K 31/06*     (2006.01)
    *H01M 8/04291*     (2016.01)
    *H01M 8/04119*     (2016.01)

(58) Field of Classification Search
    CPC ..... H01M 8/0438–0441; H01M 8/0444–0447; H01M 8/04694–04716; H01M 8/04746–04761; H01M 8/04791–04805; H01M 8/04828–04843; F16K 11/044; F16K 31/06
    See application file for complete search history.

(56) References Cited

U.S. PATENT DOCUMENTS

| | | | | |
|---|---|---|---|---|
| 2,902,052 | A | * | 9/1959 | Ohlsson ................ B30B 15/142 137/625.27 |
| 5,832,883 | A | * | 11/1998 | Bae .......................... F01L 9/04 123/90.11 |
| 2006/0099466 | A1 | * | 5/2006 | Wake ................ H01M 8/04231 429/444 |
| 2006/0130912 | A1 | * | 6/2006 | Lodolo ................ F16K 11/044 137/625.27 |
| 2006/0159966 | A1 | * | 7/2006 | Wake ................ H01M 8/04567 429/429 |
| 2007/0194261 | A1 | | 8/2007 | Kato et al. |
| 2008/0280174 | A1 | * | 11/2008 | Ogawa .............. H01M 8/04231 429/434 |
| 2009/0229692 | A1 | | 9/2009 | Rohwer et al. |

FOREIGN PATENT DOCUMENTS

| | | |
|---|---|---|
| CN | 102128283 A | 7/2011 |
| CN | 103244713 A | 8/2013 |
| EP | 1340933 A1 | 9/2003 |
| EP | 1542303 A2 | 6/2005 |
| JP | H11-280579 A | 10/1999 |
| JP | 2002-174397 A | 6/2002 |
| JP | 2006-153207 A | 6/2006 |
| JP | 2008-267569 A | 11/2008 |
| JP | 2011-127749 A | 6/2011 |
| WO | WO 2014/087983 A1 | 6/2014 |

OTHER PUBLICATIONS

"Solenoid Valves"; https://www.solenoidsolutionsinc.com/solenoid-valves/; Solenoid Solutions, Inc.; © 2017; accessed Aug. 29, 2017; 7 pages.

International Patent Application No. PCT/GB2015/053625; Int'l Preliminary Report on Patentability; dated Jun. 15, 2017; 11 pages.

European Patent Application No. 20162966.4; Extended Search Report; dated May 7, 2020; 6 pages.

\* cited by examiner

CONTROL VALVE, FUEL CELL EXHAUST ASSEMBLY AND FUEL CELL

CROSS-REFERENCE TO RELATED APPLICATIONS

This patent application is a National Stage Application of international patent application PCT/GB2015/053625 filed Nov. 27, 2015, which claims priority to Great Britain patent application 1421475.3 filed Dec. 3, 2014, the disclosures of which are incorporated by reference in their entirety.

This invention relates to a control valve. In particular, it relates to a purge control valve including a drain to manage the accumulation of fluid in a valve body of the valve. The invention also relates to a fuel cell exhaust assembly including the control valve.

Conventional electrochemical fuel cells convert fuel and oxidant into electrical energy and a reaction product. A common type of electrochemical fuel cell comprises a membrane electrode assembly (MEA), which includes a polymeric ion (proton) transfer membrane between an anode and a cathode flow paths or gas diffusion structures. The fuel, such as hydrogen, and the oxidant, such as oxygen from air, are passed over respective sides of the MEA to generate electrical energy and water as the reaction product. A stack may be formed comprising a number of such fuel cells arranged with separate anode and cathode fluid flow paths. Such a stack is typically in the form of a block comprising numerous individual fuel cell plates held together by end plates at either end of the stack. It is important that the polymeric ion transfer membrane remains hydrated for efficient operation. It is also important that the temperature of the stack is controlled. Thus, coolant may be supplied to the stack for cooling and/or hydration. It may be necessary at particular times or periodically to purge the flow paths or gas diffusion structures of the fuel cell of coolant, contaminants, or reaction by-products using a purge gas. The purge gas, which may comprise the fuel (hydrogen for example) may be flowed through the anode flow path to purge the fuel cell.

According to a first aspect of the invention we provide a control valve for controlling the exhausting of a purge gas from a fuel cell assembly, comprising a valve body having a valve member therein moveable between a first position and a second position, an inlet port for receiving a purge gas from the fuel cell assembly and an outlet port for providing an outlet for the purge gas, the valve member configured to, in the first position, prevent purge gas from flowing between the inlet port and the outlet port and, in the second position, allow the flow of purge gas between the inlet port and the outlet port, the valve body including a drain port adapted and arranged in the valve body to allow liquid to drain out of the valve body, the drain port configured to close when the valve member is in the second position.

This is advantageous as the drain port provides for the removal of liquid from the valve body, which may aid reliable operation of the valve. The purge gas received at the inlet port of the control valve may contain moisture from the fuel cell assembly and thus the drain port provides a convenient means to drain the moisture out of the valve body.

Optionally, the valve member is configured to close the drain port in the second position. Thus, rather than by a separate closure, the valve member may act to close the inlet port and drain port in its respective positions.

Optionally, the drain port and the outlet port are configured to be in fluid communication when the valve member is in the first position. This is advantageous as this may provide a substantially atmospheric pressure flow path through the valve body, which may aid drainage.

Optionally, the valve member is biased to the first position such that the purge gas inlet port is normally closed by the valve member. The bias may be provided by a biasing means, such as a spring or resilient member.

Optionally, the control valve comprises a solenoid valve and the valve member is moveable to the second position on actuation of a solenoid. Thus, the solenoid may act against the force of a biasing means.

Optionally, the drain port is open to atmosphere. Thus, the drain port provides a low pressure opening to atmosphere.

Optionally, the drain port and the outlet port are arranged on opposed sides of the valve body.

Optionally, the inlet port and the outlet port are arranged to extend through a common side of the valve body.

Optionally, the valve body and valve member are arranged to define a bypass channel that extends between the outlet port and the drain port and alongside the valve member.

According to a further aspect of the invention we provide an exhaust assembly for a fuel cell system including the control valve of the first aspect, the outlet port connected to a mixing chamber adapted to combine the purge gas leaving the control valve with a further fluid flow.

Optionally, the exhaust assembly includes an outlet to atmosphere downstream of the mixing chamber adapted to exhaust the purge gas when mixed with the further fluid.

Optionally, the mixing chamber is configured to receive an exhaust flow from a cathode assembly of the fuel cell assembly, the cathode exhaust flow comprising the further fluid flow.

Optionally, the drain port is arranged lower than the inlet and outlet ports.

Optionally, the inlet port is configured to connect to an anode assembly of the fuel cell assembly.

According to a further aspect of the invention we provide a fuel cell system including a fuel cell assembly and an exhaust assembly according to the above further aspect.

There now follows, by way of example only, a detailed description of embodiments of the invention with reference to the following figures, in which.

Figure 1:
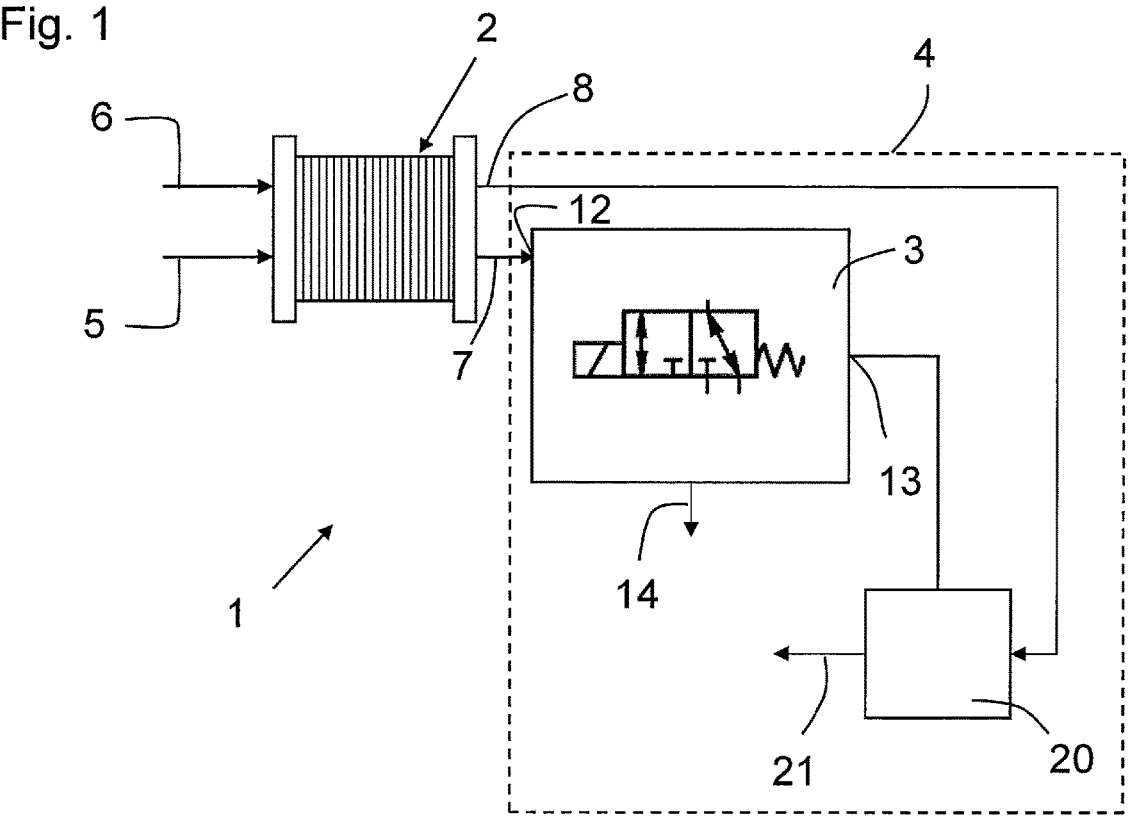
FIG. 1 shows a schematic diagram of a fuel cell system including a fuel cell assembly, exhaust assembly and a control valve.

FIG. 1 shows a fuel cell system 1 comprising a fuel cell assembly 2 and a control valve 3 for controlling the exhaust flow of a purge gas. Thus, the control valve comprises a purge control valve 3 that forms part of an exhaust assembly 4. The exhaust assembly 4 is configured to receive fluids leaving an anode flow path through the fuel cell assembly 2 and a cathode flow path though the fuel cell assembly 2. During a purge operation, a gas, such as a fuel (e.g. hydrogen) is flowed through the anode flow path to purge the anode flow path of coolant, hydration fluid, contaminants and/or reaction by-products. The purge control valve 3 is configured to control the purge gas exhaust flow that exhausts from the fuel cell assembly 2.

The fuel cell assembly 2 in this example comprises a fuel cell stack including a plurality of proton exchange membrane fuel cells stacked together. The fuel cell assembly 2 is configured to receive a flow of fuel, such as hydrogen, through an anode inlet 5 and a flow of oxidant, such as air, through a cathode inlet 6. An anode exhaust 7 is provided to allow for through flow of any unused fuel and any purge gas. A cathode exhaust outlet 8 is provided to allow for through flow of the oxidant.

Figure 2A:
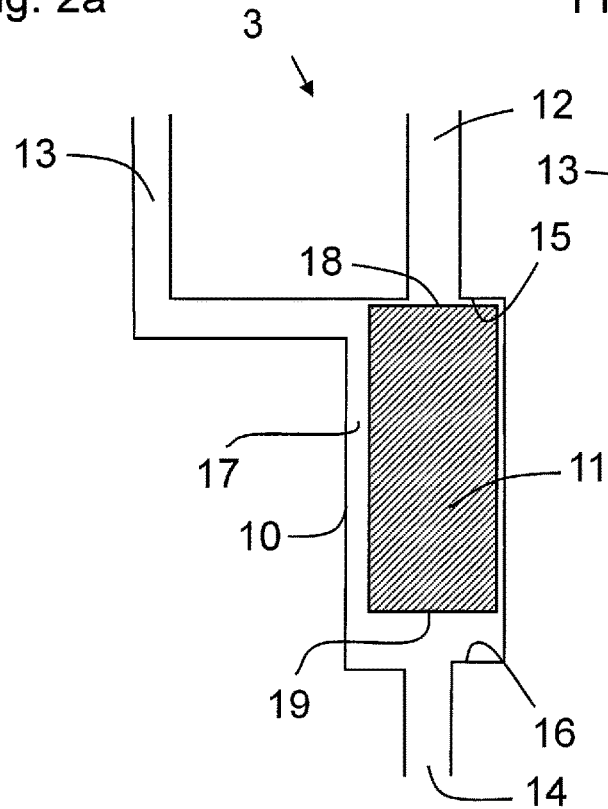
FIGS. 2a and 2b shows an example control valve in its two operating positions.
Figure 2B:
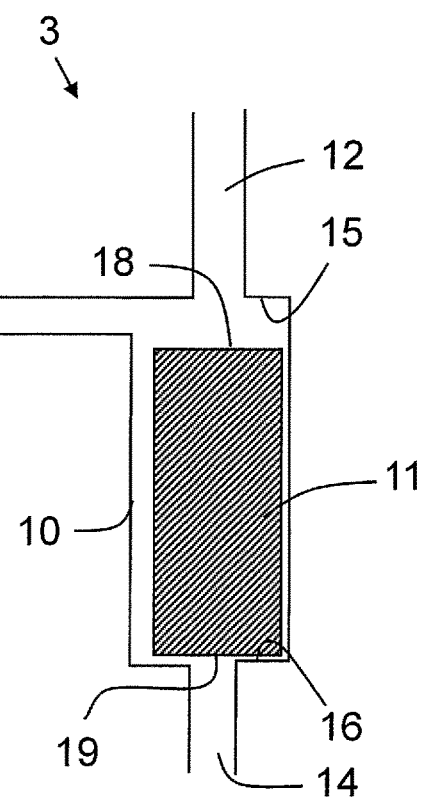

The purge control valve 3 is connected to the anode exhaust 7 and comprises a three port, two position valve. A schematic diagram of the purge control valve 3 is shown in FIG. 1 and an example valve is shown in FIGS. 2a and 2b. FIGS. 3a, 3b, 4a and 4b show further embodiments of the control valve 3 depicted in corresponding positions to those shown in FIGS. 2a and 2b. The purge control valve 3 comprises a valve body 10 containing a valve member 11. The valve member 11 may be slidably mounted in the valve body 10 and moveable between a first position (FIG. 2a) and a second position (FIG. 2b). The valve body 10 includes an inlet port 12 for receiving the purge gas exhausted from the fuel cell assembly 2 and an outlet port 13 for providing an outlet for the purge gas. The valve body 10 includes a drain port 14 adapted and arranged in the valve body 10 to allow any liquid present in the valve body 10 to drain out. The draining of liquid may be by gravity. In particular, the valve body 10 and drain port 14 are configured such that liquid that may accumulate on the valve member 11 may drain from the purge control valve 3.

In the first position (FIG. 2a), the valve member 11 acts to prevent exhausted purge gas from flowing between the inlet port 12 and the outlet port 13. Further, the outlet port 13 and drain port 14 are in fluid communication. In the second position (FIG. 2b), the valve member 11 allows the flow of purge gas between the inlet port 12 and the outlet port 13. Further, the drain port 14 is closed. Providing a closable drain port separate from the inlet port and outlet port may lead to a reliable purge gas control valve.

Thus, the valve member 11 is configured to close the inlet port 12 (and open the drain port 14) in its first position and close the drain port 14 (and open the inlet port 12) in its second position. In particular, the inlet port 12 includes a first valve seat 15 against which the valve member 11 seals in the first position. The drain port 14 also includes a second valve seat 16 against which the valve member 11 seals in the second position.

Figure 4A:
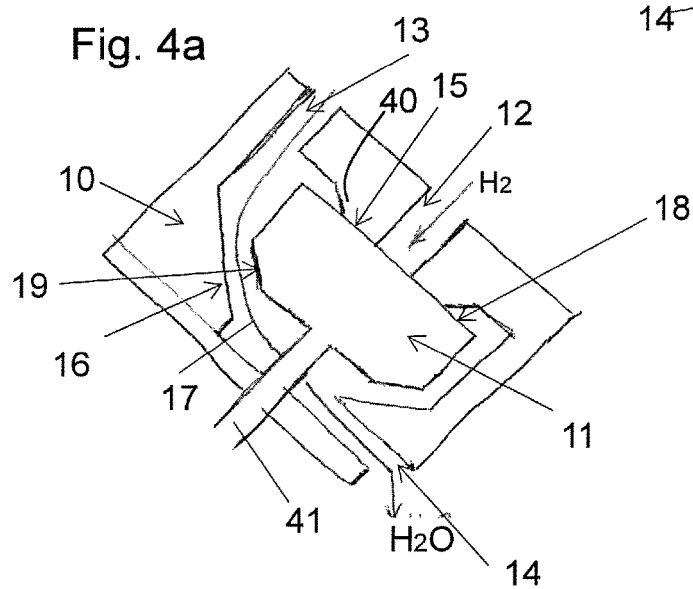
FIGS. 4a and 4b shows a further example control valve in its two operating positions.
Figure 4B:
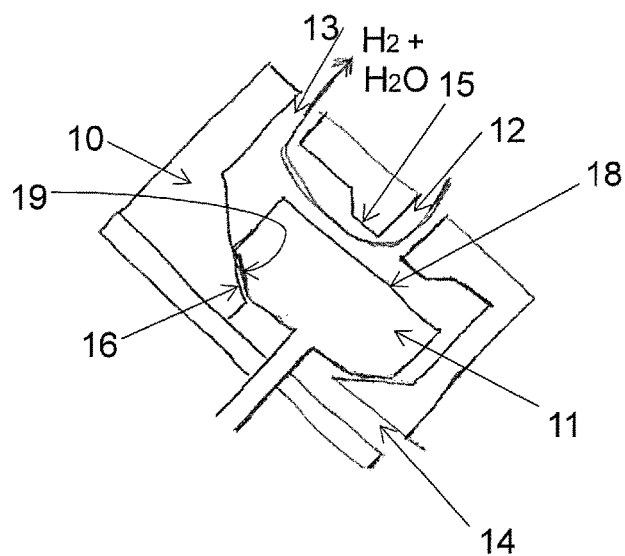

The valve member 11 includes a first sealing surface 18 and a second sealing surface 19 at opposed ends, the first sealing surface configured to seal against the first valve seat 15 and the second surface configured to seal against the second valve seat 16. In this example, the valve member is substantially cylindrical, with the sealing surfaces 18 and 19 at opposed ends. In other embodiments, other shaped valve members may be provided. FIGS. 4a and 4b depict an example wherein the valve is shaped such that the second sealing surface 19 of the valve member 11 is not parallel to the first sealing surface 18. In other embodiments, the same sealing surface may seal against both the first valve seat 15 and the second valve seat 16 when in the appropriate first or second position.

The valve member 11 is biased to the first position by a biasing means, which may comprise a spring. The purge control valve 3 may comprise a solenoid valve and thus the valve member may be movable between its first and second position by actuation of a solenoid (not shown) which is configured to move the valve member to the second position against the force of the biasing means.

In another embodiment, not shown, the valve member 11 is configured to open and close the inlet port 12 in its two positions, but the drain port 14 is open and closed by a different valve member or by pressure changes in the valve body 10.

The outlet port 13 opens into a bypass channel 17 within the valve body 10 which allows fluid flow between the outlet port 13 and the drain port 14 alongside the valve member 11 at least when it is in the first position. This is advantageous as fluid that may accumulate on the valve member 11 may drain out of the drain port 14. The valve member 11, in this example, does not close against the outlet port 13 in either of its two positions. Providing a valve in which, in the first position, fluid could flow between the outlet port and the drain port and over the valve member may lead to a well drained valve arrangement.

The valve body 10 may be configured such that, in use, the drain port 14 is arranged lower than the inlet port 12 and/or the outlet port 13. The drain port 14 may also be arranged lower than the valve member 11.

With reference to FIG. 1, the exhaust assembly 4 receives the gases from anode and cathode flow paths and, via a mixing chamber 20, releases the exhaust gases to atmosphere. The valve outlet port 13 connects to the mixing chamber 20. The cathode exhaust outlet 8 from the fuel cell assembly 2 also connects to the mixing chamber 20.

The exhaust assembly 4 includes, downstream of the mixing chamber 20, an outlet to atmosphere 21. The purge control valve 3 thus controls the flow of purge gas exhausted from the fuel cell assembly 2 to the mixing chamber 20.

In use, the purge control valve 3 may be biased to its first position. Accordingly, the inlet port 12 is closed by the valve member 11. Any liquid present in the valve body 10 can drain out via the open drain port 14. The drain port 14, in this example, is connected to atmosphere and thus liquid is free to drain under gravity, at substantially atmospheric pressure. The cathode exhaust flow from the fuel cell assembly 2 passes through the mixing chamber and out to atmosphere at outlet 21.

During a purge operation, fuel may be flowed through the anode flow path of the fuel cell assembly 2. The purge control valve 3 may be actuated, by way of the solenoid, to move the valve member 11 to the second position, which may allow the purge gas to flow through the fuel cell assembly 2. In the second position, the purge gas cannot flow directly to atmosphere through the drain port 14. Instead, it is channeled to the outlet port 13 and into the mixing chamber 20 where it is diluted with the cathode exhaust flow and vented to atmosphere.

On completion of the purge operation, the valve member 11 returns to the first position. The mixing chamber 20 may thus be open to atmosphere by its own outlet 21 and by the drain port 14. This arrangement may provide for venting of any purge gas remaining in conduits between the purge control valve 3 and the outlet 21 after the valve member has returned to the first position.

It will be appreciated that the mixing chamber 20 may comprise a dedicated volume or arrangement to receive the flows of purge gas and cathode exhaust for mixing together prior to release to atmosphere. Alternatively, the purge gas may be introduced into a conduit that carries the cathode exhaust flow to atmosphere. In both examples, mixing of the purge gas and the cathode flow may be advantageously achieved. In general, dilution of the purge gas leaving the exhaust assembly 4 with another fluid flow (whether that be the cathode exhaust flow or other fluid flow, such as atmospheric air) may be beneficial.

Figure 3A:
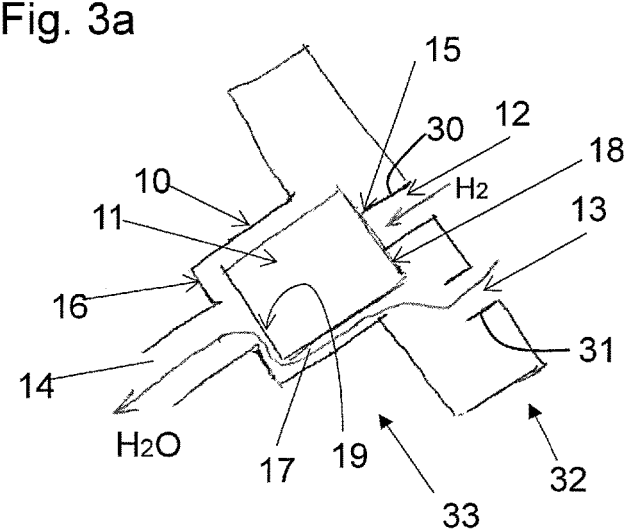
FIGS. 3a and 3b shows a further example control valve in its two operating positions.
Figure 3B:
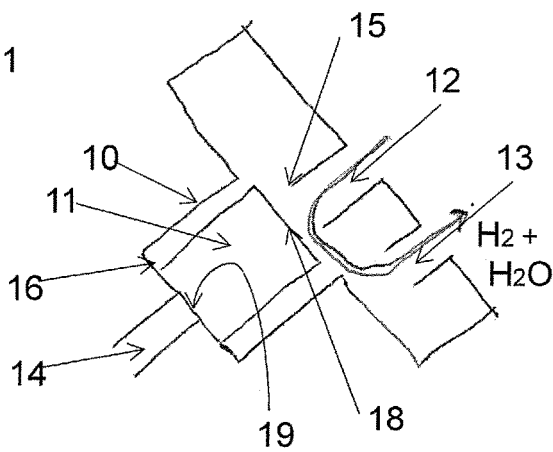

FIGS. 3a and 3b show a further example of the control valve 3 in the first and second positions. The valve shown in FIGS. 3a and 3b is substantially similar to that described above and the same reference numerals have been used for equivalent parts. In this example the inlet port 12 is defined by a flange 30 which extends into an interior volume of the valve body 10. The outlet port 13 is also defined by a flange 31 which extends into the interior volume of the valve body 10. The valve body 10 comprises a wider section 32 and a narrower section 33, wherein the inlet port 12 and the outlet port 13 open into the wider section. The inlet port 12 in the example of FIG. 3 extends further into the valve body 10 than the outlet port 13. Further, the outlet port 13 is offset from an axis of the valve member 11. The drain port 14 is situated at a terminal end of the narrower section 33 of the valve body 10. The member 11 works in the narrower section 33 and the wider section 32. The bypass channel 17 extends alongside the valve member in the narrower section 33. The inlet port 12 and the drain port 14 lie substantially along the axis of the valve member 11 so that, in the first and second positions (FIGS. 3a and 3b, respectively), the valve member can seal against the first valve seat 15 and the second valve seat 16, respectively FIGS. 4a and 4b show a further configuration of the control valve substantially as described above in relation to FIGS. 2a and 2b. In this configuration, the inlet port 12 comprises a flange 40 which extends into the valve body 10. The outlet port 13 comprises an aperture in the valve body located at an uppermost position when the valve is oriented in use. The position of the valve member 11 is controlled by a valve stem 41 which extends through the drain port 14 and out of the valve body 10. In this configuration, the drain port 14 is arranged to extend out of the valve body 10 substantially orthogonally to the direction the inlet port 12 enters the valve body. When in the first position, the valve member 11 seals against the first valve seat 15. When in the second position the valve member 11 seals against a second valve seat 16 which is inclined at an angle to the first valve seat 15. The valve member 11 is chamfered to seal against the valve seat 16. The bypass channel 17 extends alongside the valve member 11 and by a face of the valve member on which the second sealing surface 19 is formed. Thus, the bypass channel extends alongside at least two faces of the valve member 11.

The invention claimed is:

1. A fuel cell system, comprising:
a fuel cell assembly, comprising:
an anode exhaust; and
a cathode exhaust outlet; and
an exhaust assembly, comprising a control valve for controlling the exhausting of a purge gas from the anode exhaust of the fuel cell assembly,
wherein the control valve comprises:
a valve body having a valve member therein moveable between a first position and a second position;
an inlet port for receiving the purge gas from the fuel cell assembly;
an outlet port;
a drain port defined on the valve body; and
a bypass channel extending between the outlet port and the drain port and alongside the valve member,
wherein the valve member is configured to, in the first position, prevent the purge gas from flowing between the inlet port and the outlet port and, in the second position, allow the flow of purge gas between the inlet port and the outlet port, the valve member, the bypass channel, and the drain port being configured to accumulate liquid thereon, the accumulated liquid being in relation to the purge gas being exhausted through the control valve;
wherein the drain port is adapted and arranged in the valve body to allow the accumulated liquid to drain out of the valve body to atmosphere, the drain port not being in fluid communication with the inlet port or the outlet port when the valve member is in the second position,
wherein the bypass channel is in fluid communication with the outlet when the valve member is in the first position and when the valve member is in the second position; and
a mixing chamber in fluid communication with the outlet port of the control valve and the cathode exhaust outlet of the fuel cell assembly, wherein the mixing chamber is configured to receive the flows of the purge gas and the cathode exhaust from the fuel cell assembly and mix the flows together prior to release of the mixed flows to the atmosphere via a mixing chamber outlet;
wherein, when the valve member is in the first position, the mixing chamber is open to the atmosphere by both the mixing chamber outlet and a fluid communication path to and through the control valve drain port.

2. The fuel cell system of claim 1, wherein the valve member is configured to close the drain port in the second position.

3. The fuel cell system of claim 1, wherein the drain port and the outlet port are configured to be in fluid communication when the valve member is in the first position.

4. The fuel cell system of claim 1, wherein the valve member is biased to the first position such that the purge gas inlet port is normally closed by the valve member.

5. The fuel cell system of claim 1, wherein the control valve comprises a solenoid valve and the valve member is moveable to the second position on actuation of a solenoid.

6. The fuel cell system of claim 1, wherein the drain port and the outlet port are arranged on opposed sides of the valve body.

7. The fuel cell system of claim 1, wherein the inlet port and the outlet port are arranged to extend through a common side of the valve body.

8. The fuel cell system of claim 1, wherein the drain port is arranged lower than the inlet and outlet ports.

9. The fuel cell system of claim 1, wherein the drain port is opened and closed by a second valve member different than the valve member.

10. The fuel cell system of claim 1, wherein the drain port is opened and closed by pressure changes in the valve body.

11. The fuel cell system of claim 1, wherein the bypass channel extends alongside at least two faces of the valve member.

12. The fuel cell system of claim 1, wherein the valve member comprises a first sealing surface and a second sealing surface at opposed ends, with the first sealing surface configured to seal against a first valve seat in the valve body and the second sealing surface configured to seal against a second valve seat in the valve body.

13. The fuel cell system of claim 12, wherein the first sealing surface is not parallel to the second sealing surface.

14. The fuel cell system of claim 13, wherein the first valve seat is inclined at an angle to the second valve seat and the valve member is chambered to seal against the second valve seat.

15. The fuel cell system of claim 13, wherein the drain port is arranged to extend out of the valve body substantially orthogonal to the direction the inlet port enters the valve body.

16. The fuel cell system of claim 13, wherein the position of the valve member is configured to be controlled by a valve stem that extends through the drain port and out of the valve body.

17. The fuel cell system of claim 13, wherein the outlet port comprises an aperture in the valve body that is configured to be located at an uppermost position when the control valve is oriented in use.

18. The fuel cell system of claim 1, wherein the valve member comprises a sealing surface, with the sealing surface configured to seal against a first valve seat in the valve body in the first position and configured to seal against a second valve seat in the valve body in the second position.

19. The fuel cell system of claim 1, wherein the fuel cell assembly comprises a fuel cell stack comprising a plurality of proton exchange membrane fuel cells stacked together and configured to receive a flow of fuel through an anode inlet and a flow of oxidant via a cathode inlet.

* * * * *